US005761541A

United States Patent [19]

Constable et al.

[11] Patent Number: 5,761,541

[45] Date of Patent: Jun. 2, 1998

[54] SINGLE USE CAMERA WITH FLASH CHARGING CIRCUIT

[75] Inventors: Douglas W. Constable; Joseph C. Weiser, both of Rochester, N.Y.

[73] Assignee: Eastman Kodak Company, Rochester, N.Y.

[21] Appl. No.: 825,077

[22] Filed: Mar. 27, 1997

Related U.S. Application Data

[63] Continuation of Ser. No. 798,402, Feb. 7, 1997, abandoned.

[51] Int. Cl.[6] ........................ G03B 15/05; G03B 17/02

[52] U.S. Cl. ........................ 396/6; 396/176; 396/206

[58] Field of Search ........................ 396/6, 176, 205, 396/206

[56] References Cited

U.S. PATENT DOCUMENTS

| | | | |
|---|---|---|---|
| Re. 34,168 | 1/1993 | Ohmura et al. | 396/176 |
| 3,958,258 | 5/1976 | Beach | 396/185 |
| 4,369,395 | 1/1983 | Stempeck . | |
| 5,353,079 | 10/1994 | Sakai et al. | 396/176 |
| 5,506,646 | 4/1996 | Dunsmore et al. | 396/6 |
| 5,565,943 | 10/1996 | Muramatsu et al. | 396/6 |
| 5,634,153 | 5/1997 | Constable | 396/206 |

FOREIGN PATENT DOCUMENTS

| | | |
|---|---|---|
| 9-54362 | 2/1997 | Japan . |

*Primary Examiner*—Alan A. Mathews
*Attorney, Agent, or Firm*—Francis H. Boos, Jr.

[57] ABSTRACT

A single use camera having an electronic flash assembly including a flash charging circuit and a flash illumination circuit is provided with one or more access openings in the camera cover. The access openings are aligned with contact terminals in the flash charging circuit to allow insertion of a shorting device that acts to disable operation of the flash charging circuit. This is useful during a film loading operation to prevent charging of the flash capacitor which might otherwise be caused by electrostatic start up of the flash charging circuit. Preventing operation of the flash charging circuit in preference to shorting of the flash capacitor directly preserves battery power and assures the flash charging transistors will not be damaged by attempting to charge into a short circuited flash capacitor.

10 Claims, 4 Drawing Sheets

39
74
70
103
101
35
49b
80
100
49a
102
43

SINGLE USE CAMERA WITH FLASH CHARGING CIRCUIT

CROSS-REFERENCE OF RELATED APPLICATIONS

This is a continuation of application Ser. No. 08/798,402, filed Feb. 7, 1997, now abandoned.

FIELD OF THE INVENTION

This invention relates generally to the field of photographic cameras, and in particular to single use cameras having flash assemblies. More particularly, the invention relates to a method and apparatus for controlling the functioning of the flash assembly during film loading operation to prevent inadvertent exposure of the film by an element of the flash assembly caused by build-up of electrostatic charge during film loading.

BACKGROUND OF THE INVENTION

Typically during the manufacture of a single use camera incorporating a flash assembly in the camera, the flash assembly with its printed circuit board and a battery are mounted on the camera body. A front cover is then assembled to the body covering the flash assembly and its printed circuit board. After testing for proper operation of the flash assembly, the camera is placed in a dark environment during which the photographic film is loaded by withdrawing the film from its cassette and pre-winding it on a take up spool. The back cover is then assembled to the camera to form a light tight camera assembly. The camera is then removed from the film loading station and is ready for sale. It is also common practice to place a label on the camera that covers some of its physical features that are non-functional during normal picture taking.

U.S. Pat. No. 34,168 discloses a single use camera of the above type that incorporates a pair of holes in the front cover to provide access by a shorting bar to terminals of a flash capacitor in the flash assembly during the film loading operation and before the label is affixed to the camera. The described purpose of this feature is that by keeping the shorting bar inserted in the access openings, the capacitor is maintained fully discharged until the film cassette and rolled unexposed film are fully loaded and the back cover is put in place to provide light tight film cassette receiving and film takeup chambers. In this way, inadvertent exposure of the film during the film loading operation is avoided.

Commonly assigned U.S. Pat. No. 5,506,646, discloses a single use camera having a flash assembly and which also is provided access holes in the front cover to allow access to the flash capacitor by a battery supply for fast charging of the flash capacitor as part of a flash firing test of the flash assembly. The flash charging circuit in this patent employs a high gain cascaded transistor oscillation feedback to maintain oscillation during charging of the main flash capacitor. With this arrangement, relatively low levels of energy feedback from the flash circuit during discharge of the flash tube cause automatic restarting of the flash charging circuit for recharging of the flash capacitor in preparation for the next picture taking event. It has been found that with this flash circuit, electrostatic charge during handling of the camera under some circumstance can cause the flash charging circuit to start operation even if the camera user does not particularly want this to occur. In commonly assigned allowed U.S. application Ser. No. 08/575,658—Constable, filed Dec. 21, 1995, this unwanted starting of the flash charging circuit during normal camera use is eliminated by provision of a resistor between the base of the first oscillation transistor and ground, the effect of which is to bleed off electrostatic charge build up and thus prevent the electrostatic charge from unwanted starting of flash charging operation. However, during a film loading operation in a camera assembly operation, electrostatic charge conditions are more serious than would be encountered by a camera user walking on a carpet. If electrostatic charge causes the flash charging circuit to start operation during film loading, the flash capacitor can become charged to sufficiently high potential to cause the typical "flash ready" light to be turned on causing exposure of the film being loaded. If the shorting bar feature as described in the '168 is employed, the flash capacitor will be prevented from charging up to charge voltage needed to turn on the flash ready light and the problem can thereby be avoided. However, a problem with the '168 patent feature is that while shorting out the flash capacitor prevents charging of the flash capacitor, the flash charging circuit remains operating at full current conditions. Continued operation under these conditions can damage the oscillation transistors and also needlessly serves as a drain on the single use camera battery. There is therefore a need for an arrangement operative during film loading in a single use camera which will prevent build up of charge on the flash capacitor and at the same time prevent the flash charging circuit from operating.

SUMMARY OF THE INVENTION

Thus, in accordance with one aspect of the invention, there is provided a method of loading a roll of unexposed film into a single use camera having an electronic flash assembly including a flash illumination circuit and a flash charging mounted behind a front cover, wherein the method comprises inserting shorting means through access openings provided in the front cover in such a manner as to disable operation of the flash charging circuit during the film loading operation.

In another aspect of the invention, a single use camera is provided wherein the camera has a roll of unexposed film, a taking lens, an electronic flash assembly including a flash charging circuit and a flash illumination circuit and a cover enclosing said film roll and said flash assembly in light tight manner, the camera characterized by the cover having at least one access opening allowing insertion of short circuit means to contact electrical contacts in the flash charging circuit to disable operation of the flash charging circuit and preferably to prevent the start of self oscillations in the flash charging circuit.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
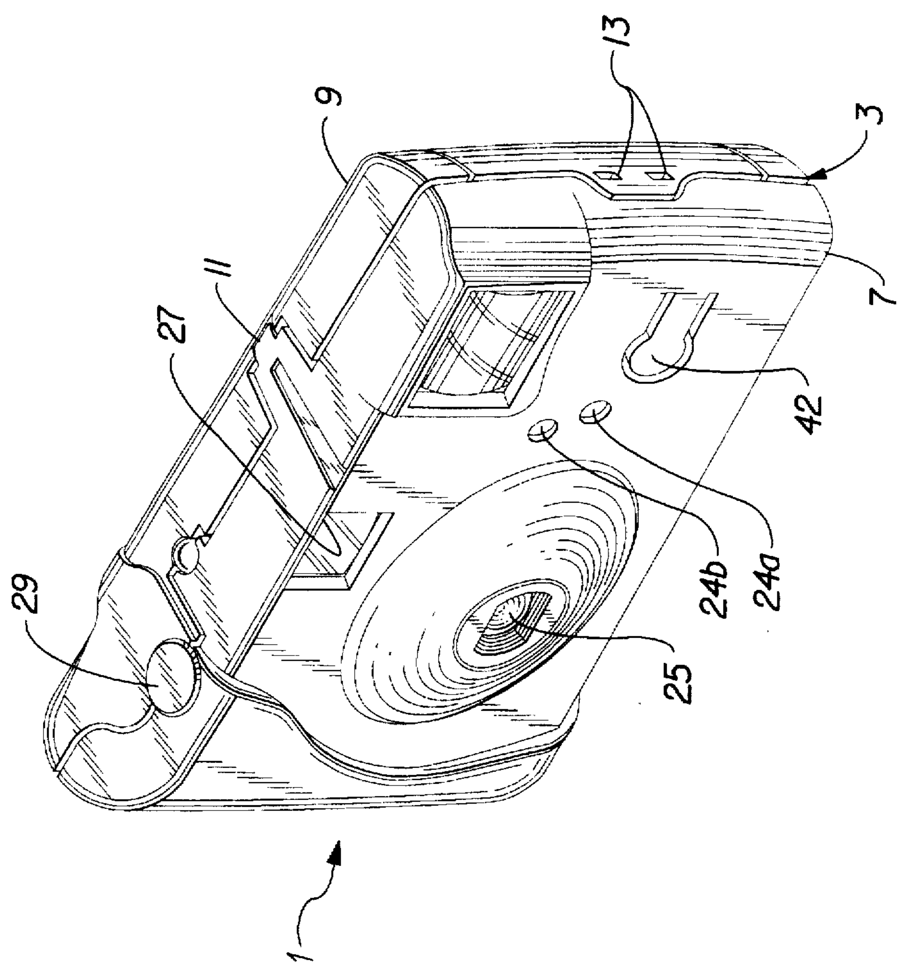
FIG. 1 is a front perspective view of a single use camera used in accordance with a preferred embodiment of the present invention.
Figure 2:
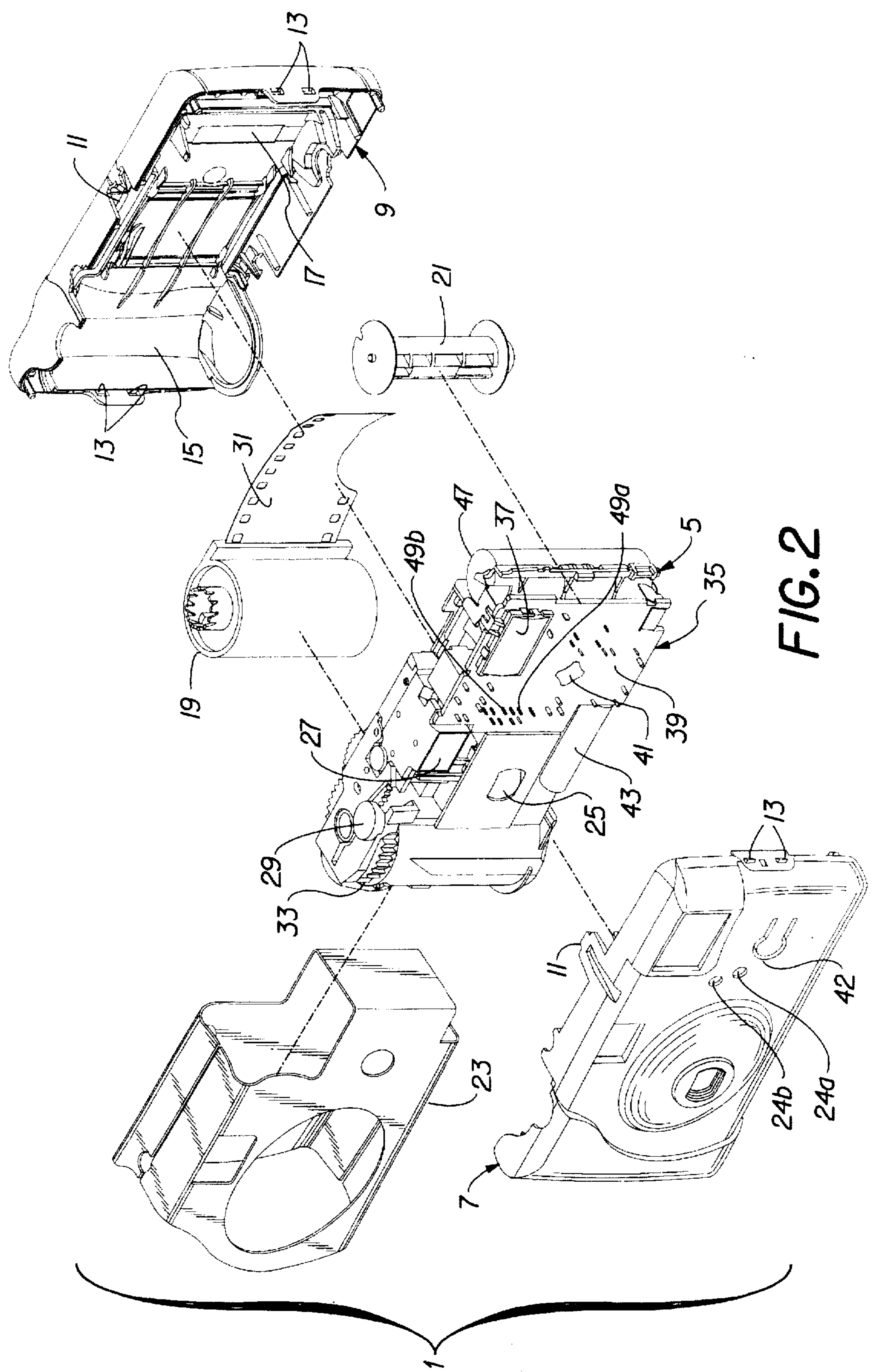
FIG. 2 is a an exploded front perspective view of the single use camera illustrated in FIG. 1.

Referring to FIGS. 1–2, there is shown a single use camera 10 having a plastic molded body 3, including a frame section 5 defining a middle portion of the camera which is used to retain the majority of photographic components of the camera 1, as described briefly below. A front cover section 7 and a rear cover section 9 are snap fitted together to the front and rear of the frame portion 5, respectively, by snaps 11, 13 in the manufacturing assembly of the camera 1. A pair of molded chambers 15, 17 are provided in the rear of the frame portion 5 and the rear cover section 9 for housing a film cassette 19 and a take-up spool 21, respectively. First and second access openings **24*a*, 24*b* are provided in the front cover 7 to provide access to electrical contacts on a flash assembly circuit board 39 described below. When finally assembled, a decorative label 23 is attached to the exterior of the camera body 3 and covers the access openings 24*a*, 24*b***.

The camera 1 also includes a taking lens 25 and a viewfinder 27, as are commonly found in other photographic cameras, as well as a depressable shutter release button 29 located on the top of the camera body 3. The filmstrip 31 contained within the film cassette 19 is prewound onto the take-up spool 21 for advancement back into the cassette by means of a film advance wheel 33 which pulls film from the take-up spool over a sprocket (not shown) across an exposure gate (not shown) and into the cassette.

Still referring to FIGS. 1–2, an electronic flash assembly 35 is attached to the frame portion 5 of the camera 1. Briefly, this assembly includes a flash head 37; a circuit board 39; a momentary switch 41 attached to the circuit board; a flash capacitor 43 mounted lengthwise beneath the taking lens 25; and a direct current power source 45, such as a battery 47. First and second electrical contacts **49*a*, 49*b* are provided on the facing surface of the circuit board 39, the purpose of which are described below. When assembled, the camera 1 includes a cantilevered portion 42 of the front cover 7 which serves to access the momentary switch 41**.

Figure 3:
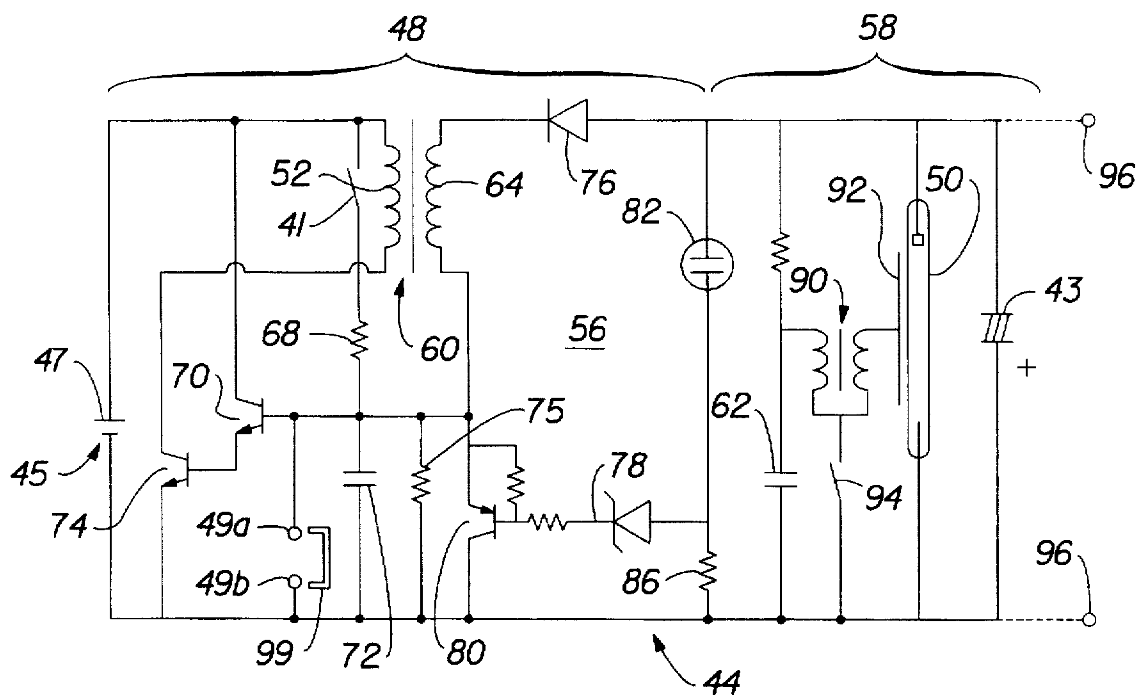
FIG. 3 is a an electrical schematic diagram of a flash charging and control circuit of the electronic flash assembly depicted in FIGS. 1 and 2.

Referring to the electrical schematic of FIG. 3, the flash assembly 35 includes a charging and control circuit 44, including the battery 47; a self-oscillating flash charging circuit 48; an oscillation arresting circuit 56, and a flash illumination circuit 58, including main flash capacitor 43.

Referring specifically to the electrical schematic of FIG. 3, the self-oscillating charging circuit 48 includes a voltage converting transformer 60 having primary and secondary windings 52,64, respectively; the previously referred to momentary switch 41 for initiating oscillations in the circuit; a resistor 68 placed in series with the momentary switch 41; ganged transistors 70, 74, acting as switching elements for supporting and maintaining the oscillations; and a diode 76 for rectifying current induced in the secondary windings 64 of the transformer.

Normal charging of the flash assembly 35 is initiated by a single depression of the momentary switch 41, thereby establishing current flow through the resistor 68, transistors 70, 74, and the primary transformer winding 52. The switch 41 connects the base of the transistor 70 to the battery 47 through the resistor 68. Current flowing from the battery 47 into the base of the transistor 70 is multiplied by a transistor gain of fifty (50) and flows to the base of the transistor 74. The current is multiplied again at the transistor 74, with a gain of two hundred (200), and flows through the collector of transistor 74 and the transistor primary winding 52. As the current flow builds in the primary winding 52, it inductively induces current flow in the secondary winding 64. Current flows out of the secondary winding, charging the flash capacitor 43, and into the base of the transistor 70, providing positive feedback which sustains oscillations in the charging circuit. Once initiated, the oscillations are self sustaining even after momentary switch 41 is opened.

The oscillation arresting circuit 56 includes a zener diode 78 connected from the junction of neon ready light 82 and resistor 86 to the base of a digital pnp transistor 80. The charge voltage on flash capacitor 43 is sensed by neon ready light 82 which begins conducting at two hundred seventy volts (270 v.), whereupon the voltage drop across the ready light falls to two hundred and twenty volts (220 v.) when it is conducting. The voltage sensor 78, which includes the ready light 82 and the zener diode in series, begins conducting at about three hundred and thirty volts (330 v.), which also represents a predetermined or full charge desired on flash capacitor 43. When the flash capacitor 43 is fully charged, the zener diode 78 begins to conduct, applying current to the base of the transistor 80, switching the transistor 80 on, and grounding the self-oscillating charging circuit 48. Oscillations in the circuit 48 are thereby arrested, and charging stops.

The flash trigger circuit 58 includes a triggering capacitor 62, a voltage converting transformer 90, a flash triggering electrode 92, and a synchronizing switch 94. The triggering capacitor 62 is charged by current flow through the secondary winding 64 at the same time and in the same manner as the flash capacitor 43. In normal operation, the synchronizing switch 94 is closed by the camera shutter button 29 at the proper time in the exposure sequence. The capacitor 62 discharges through the primary windings of the voltage converting transformer 90, inducing about four thousand volts (4 kv.) in the triggering electrode 92, and ionizing the gas in the flash tube 50. The flash capacitor 43 then discharges through the flash tube 50, exciting the ionized gas and producing sufficient flash illumination. An additional capacitor 72 according to this embodiment provides filtering on the base of the transistor 70 to keep the circuit from inadvertently turning on due to undesirable noise, such as the neon ready light 82 turning off or from battery bounce.

Typically, the flash charging circuit 48 is off (not oscillating) when a picture is taken and the flash tube is fired. Due to the relatively high gain of the oscillation transistors 70,74, electrical energy from firing of the flash tube and fed back to the base of transistor 70 via secondary winding 64 causes transistor 70 to begin conducting which, in turn, restarts conduction of transistor 74 thereby desirably restarting the charging operation of the flash charging circuit. Because of the high gain sensitivity of the oscillation transistors 70, 74, relatively small electrical effects, such as caused by battery bounce resulting from jostling of the camera or electrostatic charge induced when a camera user walks on a dry carpet, can cause inadvertent start up of the camera. Capacitor 72 from the base of transistor 70 to ground provides a bypass of electrical impulses resulting from battery bounce. Similarly, a resistor 75 connected from the base of transistor 70 to ground serves to bleed down any small amounts of electrostatic charge build caused by normal handling of the camera thereby preventing inadvertent restart of the flash charging circuit 48.

However, during film loading in the process of camera assembly, it is possible for excessive electrostatic charge to be generated that may be too great for resistor 75 to bleed down quickly enough to prevent restarting of the flash charging circuit. In this event, it may be possible that the flash charging circuit would turn on and cause charging of flash capacitor 43 and consequent turn on of ready light 82 causing fogging of the film being loaded. If, as taught by the aforementioned '168 patent, a shorting bar were placed across the terminals of the flash capacitor as represented in FIG. 3 by terminals 96, the flash capacitor would not charge and exposure damage to the film would be avoided. However, the flash charging circuit 48 would continue operating into effectively a short circuit across the secondary winding 64. This would cause the trahigstors 70,74 to conduct at very high current levels and could cause damage, such as burn out of the transistors. Even if the transistors were not seriously damaged, the high current conduction would constitute an unnecessary drain on the battery 17 which could cause unreliable operation of the camera during normal picture taking operations.

Figure 5:
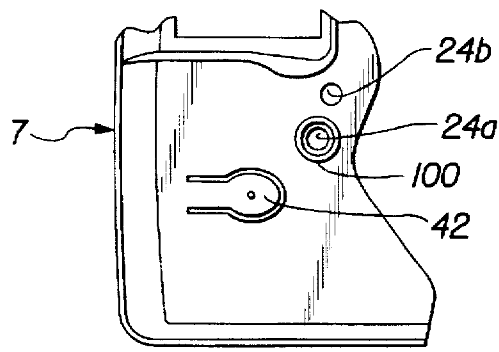
FIG. 5 is a partial plan view of the inside of the camera cover shown in FIG. 2.
Figure 4:
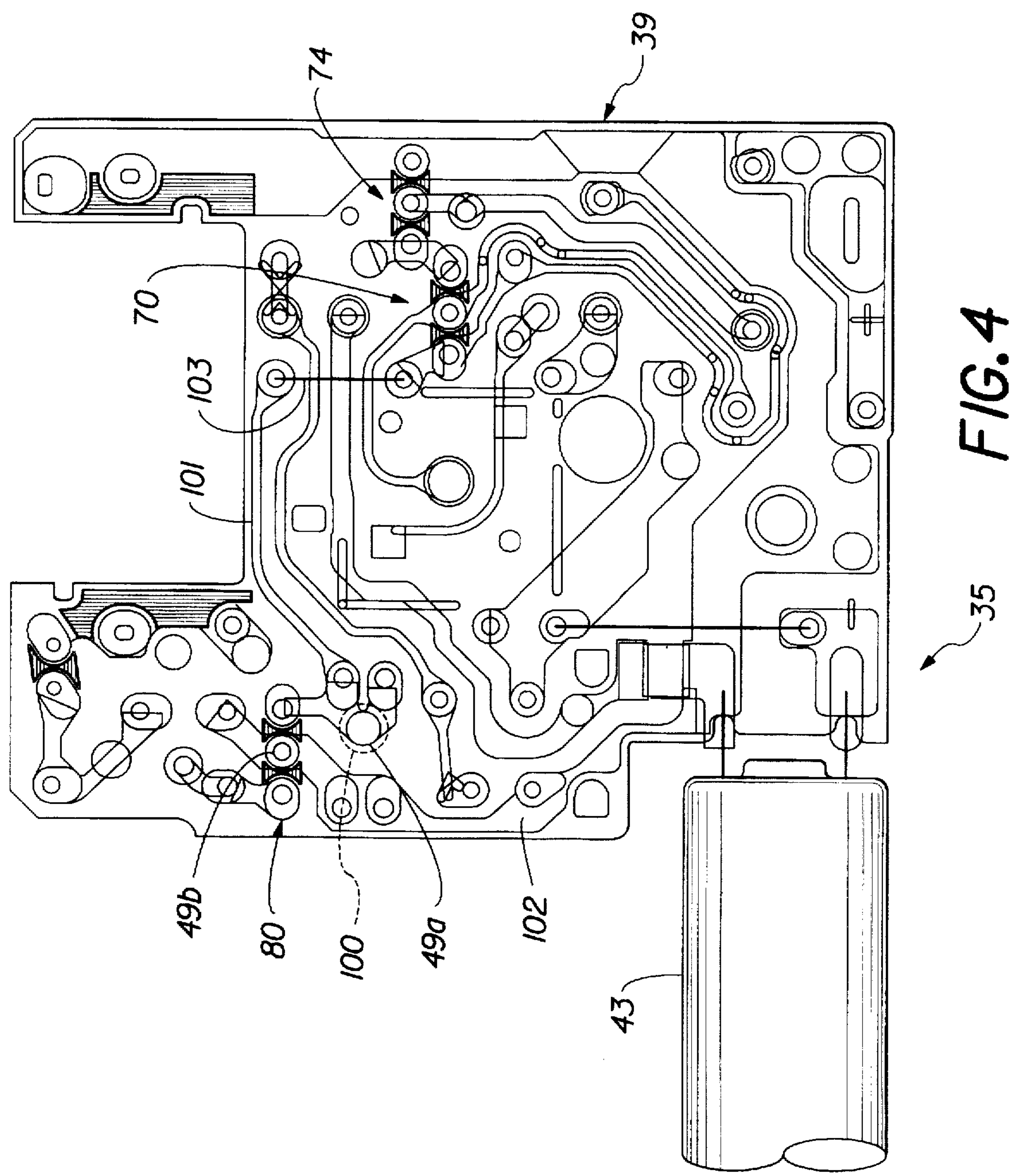
FIG. 4 is a plan view of a printed circuit board implementing the schematic circuit shown in FIG. 3.

In accordance with the invention, electrical contacts are provided between the base of one of the oscillation transistors 70,74 to ground, preferably between the base of transistor 70 and ground. For this purpose, referring jointly to FIGS. 4 and 5, access openings 24*a*, 24*b* are provided in front cover 7 in such locations as to be in alignment with contact terminals 49*a*, 49*b* on the printed circuit board 39. In FIG. 4, contact 49*b* is the collector terminal of transistor 80 which is connected to ground trace 102 to which the positive terminal of flash capacitor 43 is also connected. Contact 49*a* is connected from the emitter terminal of transistor 80 via trace 101 and a jumper wire 103 to the base terminal of transistor 70. FIG. 5 shows a cutaway portion of the inner surface of front: cover 7 illustrating the positions of access openings 24*a*, 24*b*. Also shown is a raised wall 100 which isolates the opening 24*a* to ensure that a shorting probe wire 99 (FIG. 3) inserted through the opening is limited to the contact point 49*a*. Although not expressly shown, it will be appreciated that a similar raised wall surrounding access opening 24*b* may also be employed for the same purpose. While the shorting of the base of either transistor 70 or transistor 74 to ground will be effective to prevent the starting of charging circuit 48 (with the alignment of access opening 29*a* being positioned accordingly over the printed circuit board 39), it is preferred to use the base of transistor 70. This will ensure that both transistors 70 and 74 are disabled from conducting so long as the shorting bar is inserted in the access openings. If only transistor 74 had its base shorted to ground, it might be possible that momentary switch 41 could be closed during the film loading operation thus placing the transistor collector-emitter junctions directly across battery 47 with potential damage to the transistor.

The invention has been described with reference to a preferred embodiment. However, it will be appreciated that variations and modifications can be effected by a person of ordinary skill in the art without departing from the scope of the invention.

PARTS LIST

1 single-use camera
3 plastic body
5 frame portion
7 front cover
9 rear cover
11 snap engagement feature
13 snap engagement feature
15 chamber
17 chamber
19 film cassette
21 film spool
23 label
24*a,b* access openings
25 taking lens
27 viewfinder
29 shutter release button
31 filmstrip
33 film advance wheel
35 electronic flash assembly
37 flash head
39 circuit board
41 momentary switch
42 cantilevered portion of front cover
43 flash charge capacitor
44 flash charging and control circuit
45 direct current power source
47 battery
48 self-oscillating flash charging circuit
49*a,b* oscillation transistor shorting contacts
50 flash tube
52 primary transformer winding
56 oscillation arresting circuit
58 flash trigger circuit
60 charging circuit transformer
62 triggering capacitor
64 secondary transformer winding
68 resistor
70 transistor
72 capacitor
74 transistor
75 resistor
76 rectifying diode
78 zener diode
80 digital transistor
82 neon ready light
86 resistor
90 transformer
92 flash triggering electrode
94 synch switch
96 flash capacitor contact terminals
100 raised wall inside front cover
101 transistor 70 base contact trace
102 ground trace
103 jumper wire

What is claimed is:

1. A method of loading a roll of unexposed film into a single use camera having an electronic flash assembly including a flash illumination circuit having a flash capacitor therein and a flash charging circuit for charging said flash capacitor, the flash charging circuit being mounted behind a front cover, the method comprising inserting shorting means through access openings provided in the front cover in such a manner as to disable operation of the flash charging circuit during the film loading operation.

2. The method of claim 1 wherein the flash charging circuit includes a self oscillating circuit and the step of inserting shorting means includes contacting terminals in said self oscillating circuit to prevent said self oscillations from occuring.

3. The method of claim 1 wherein the flash charging circuit includes at least one oscillation transistor and the method includes shorting a base terminal of the oscillation transistor to ground to prevent current flow through the transistor during film loading.

4. A single use camera having a roll of unexposed film, a taking lens, an electronic flash assembly including a flash illumination circuit having a flash capacitor therein, a flash charging circuit for charging said flash capacitor and a cover enclosing said film roll and said flash assembly in light tight manner, the camera characterized by said cover having at least one access opening allowing insertion of short circuit means to contact electrical contacts in the flash charging circuit to disable operation of the flash charging circuit.

5. The single use camera of claim 4 wherein the flash charging circuit includes a terminal electrically common to all circuit components in the flash charging circuit and includes a self oscillating circuit having an input terminal adapted to receive electrical energy for restarting oscillations in the oscillating circuit and said at least one access opening is aligned with said oscillation input terminal to allow said input terminal to be shorted to said common electrical terminal.

6. The single use camera of claim 4 wherein said flash charging circuit includes a ground terminal and at least one oscillation transistor having a base terminal and said at least one access opening comprises a first access opening aligned with said ground terminal and a second access opening aligned with said base terminal so as to allow insertion of said shorting bar to short said base terminal to said ground terminal to disable operation of said oscillation transistor.

7. A cover for a single-use camera part having an electronic flash assembly including a flash illumination circuit having a flash capacitor therein and a flash charging circuit for charging, said flash capacitor, said flash charging circuit having accessible electrical terminals, the cover comprising:

at least one access opening allowing insertion of short circuit means to make electrical contact with said flash charging electrical terminals to disable operation of the flash charging circuit; and means for fitting said cover over the camera part with said at least one access opening positioned to allow the short circuit means only to make electrical contact with said electrical terminals.

8. The cover of claim 7 wherein said charging circuit is located on the front of the camera and said cover comprises a front camera cover.

9. A method of placing a cover on a single use camera part having an electronic flash assembly including a flash illumination circuit having a flash capacitor therein and a flash charging circuit for charging said flash capacitor, said flash charging circuit having accessible electrical terminals; the method comprising the steps of:

providing said cover with at least one access opening; and placing said cover on the single use camera with said at least one access opening positioned to allow insertion of short circuit means to make electrical contact only with said electrical terminals of said flash charging circuit to disable operation of the flash charging circuit.

10. A single-use camera cover part for covering an electronic flash including a flash illumination circuit having a flash capacitor and a flash emission tube and including a flash charging circuit for charging said flash capacitor with a pair of electrical terminals spaced from the flash emission tube and which, when contacted by a short circuiting device, disable the flash charging circuit, said cover part comprising a flash emission opening and being configured to fit over the electronic flash with said flash emission opening in front of the flash emission tube, and characterized in that:

at least one access opening is positioned on said cover part relative to said flash emission opening for receiving the short circuiting device to allow the short circuiting device to make electrical contact only with the pair of electrical terminals when the cover part is fit over the electronic flash with said flash emission opening in front of the flash emission tube.

* * * * *